July 12, 1966    L. GRESS ET AL    3,260,651
GAS AND LIQUID TIGHT JOINT OF GRAPHITE BODIES
Filed March 27, 1962    2 Sheets-Sheet 1
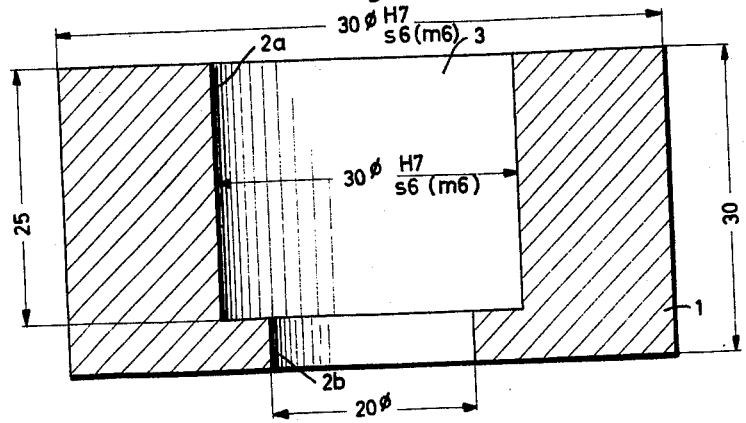
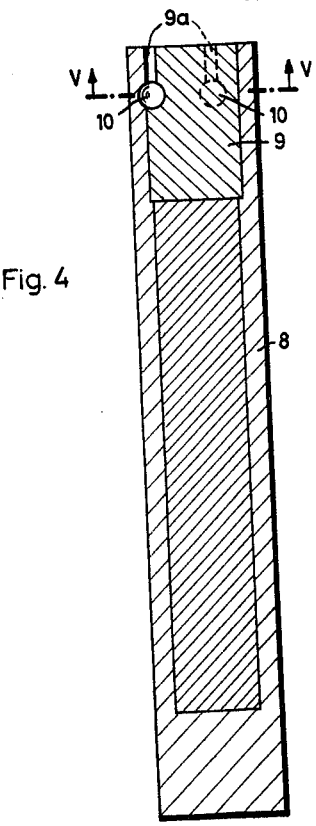
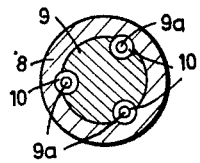

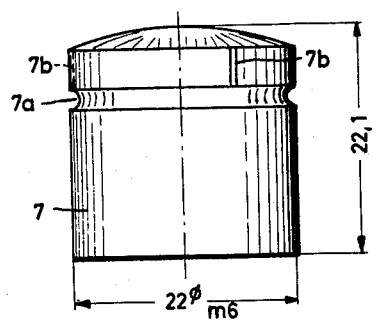
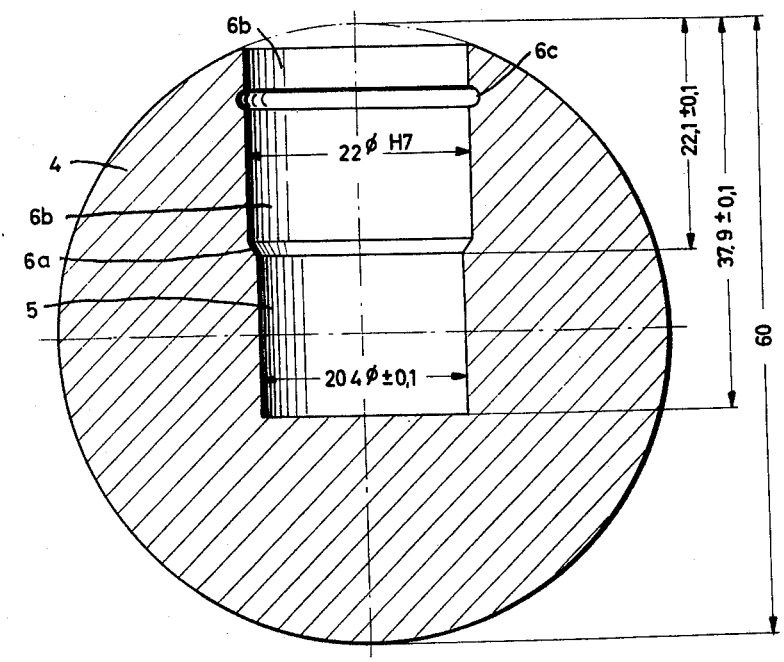

United States Patent Office 3,260,651
Patented July 12, 1966

3,260,651
GAS AND LIQUID TIGHT JOINT OF GRAPHITE BODIES
Ludwig Gress, Augsburg, and Friedrich Selka, Meitingen uber Augsburg, Germany, assignors to Siemens-Planiawerke Aktiengesellschaft fur Kohlefabrikate, Meitingen uber Augsburg, Germany, a corporation of Germany
Filed Mar. 27, 1962, Ser. No. 182,913
Claims priority, application Germany, Mar. 29, 1961, S 73,220
10 Claims. (Cl. 176—79)

Our invention relates to gas- and liquid-tight joints between two bodies of graphite and the like carbon substances. Such sealed joints are particularly needed for hollow bodies of graphite, particularly if the bodies themselves are gas- and liquid-tight. This is the case, for example, with graphite tubes for various chemical purposes which must be connected and sealed together with each other. The same requirement applies to graphite-enveloped nuclear fuel elements for high-temperature reactors. After the nuclear fuel is placed into the graphite jacket or envelope through an inlet opening, the opening must be closed by a plug. It is then necessary to provide for a sealed junction between the graphite envelope and the plug to prevent the passage of gas and liquid.

It is an object of our invention to devise a particularly simple and effective solution for such problems.

According to the invention, the junction of the graphite or carbon bodies is designed as an adhering or resting fit, i.e. a fit of the types called "snug fit," "wringing fit," "tight fit" and "force fit." Preferably, however, the junction of the two carbon bodies is designed as a force fit or pressure fit, requiring that the two mating and interfitted carbon bodies be given negative allowance and a correspondingly small amount of tolerance so that the bodies must be seated in one another by application of pressure. It has been found that although graphite is relatively soft and ordinarily appears unsuitable for such type of fittings, a reliably sealed joint between graphite bodies is thus obtained in a very simple manner. The terms "adhering fit," "force fit" and the intermediate self-holding fits mentioned above, are to be understood in accordance with the terminology of the German standards as apparent from those previously published as DIN No. 7165, and now published as DIN No. 7154, Sheets 1 and 2 of September 1956, obtainable from Beuth-Vertrieb G.m.b.H., Cologne, Germany. Particularly applicable for the purposes of the invention are the allowances and tolerances designated as fits H6/n5 to m5, or H7/n6 to s6 on DIN No. 7154, Sheets 1 and 2, for the bore/insert-member of the two graphite bodies to be joined. For example, the fit H6/n5 to m5, applied to a bore diameter of 22 mm., denotes a tolerance between +0.013 mm. and −0.0 mm., and applied to a mating plug or insert also of 22 mm., denotes a tolerance of +0.024 to +0.015 or +0.017 mm. to +0.008 mm. The fit H7/n6 to s6 applied to a bore of 22 mm. diameter denotes a tolerance of +0.021 mm. to −0.0 mm., and applied to a mating plug or insert of 22 mm. diameter denotes a tolerance of +0.028 mm. to +0.015 mm. or +0.048 mm. to +0.033 mm.

The definition of an "adhering or resting fit" in the sense of snug fit, wringing fit, tight fit and force (pressure) fit is also in accordance with the American standards as apparent, for example from Tables 2 to 5 in section 12, pages 24 to 27 of Kent's Mechanical Engineer's Handbook, published by John Wiley & Sons, Inc., New York, 1938.

The invention will be further described and explained with reference to embodiments of carbon-body joints according to the invention illustrated by way of example on the accompanying drawings in which:

FIG. 1 is a sectional view of an adhering-fit closure formed by a cylindrical plug in a cylindrical opening of a plate.

FIG. 2 shows in longitudinal section a nuclear-fuel element of spherical shape enclosed in a body of graphite, the appertaining plug being removed.

FIG. 3 is a lateral view of the plug to be inserted into the graphite body according to FIG. 2.

FIG. 4 is a longitudinal section of a nuclear fuel element of cylindrical shape with a sealed closure according to the invention; and FIG. 5 is a cross section along the line V—V in FIG. 4.

According to FIG. 1, a plate 1 of graphite has a cylindrical opening whose upper portion 2a has a diameter, for example, of 30 mm. and whose lower portion 2b a diameter of 20 mm. This provides the opening 2a, 2b with a peripheral shoulder to serve as a stop for a cylindrical plug 3 which closes the opening. The plug 3 therefore fills only the upper portion 2a of the cylindrical opening. The portion 2a of the opening is machined to accurate dimensions corresponding to the fit H7 (DIN 7154). The plug 3 is given the dimensions (namely the allowance and tolerance) s6 or m6 for a diameter of 30 mm. corresponding to the same German standards DIN 7154. The equivalent American standards for a medium force fit, requiring the fitted parts to have a negative allowance, may also be chosen. The plate 1 may constitute part of a housing, for example of an envelope for a nuclear fuel element.

The graphite material from which the bodies 1 and 3 are made may consist of a die-pressed fine-grained material having a grain size of up to 0.1 mm. This graphite material was successfully used in joints made and employed according to the invention. The axis of the cylindrical opening 2a, 2b and the corresponding axis of the cylindrical plug 3 extended in the die-pressing direction in the specimens tested. The finished shaped bodies or plates from which the parts 1 and 3 were made, were sealed by synthetic resin impregnation. With these shaped bodies, having the dimensions mentioned above and represented in FIG. 1, a permeability of $K=1.3 \cdot 10^{-4}$ cm.$^2$/sec.$^{-1}$ was measured by the known vacuum-decay method and hence was determined with a maximal pressure gradient of 1 atmosphere in the specimen.

The two parts 1 and 3 of the joint were gas and liquid-tight joined with each other by the cylindrical self-adhering force fit. The plug 3 was pressed into the body 1 down to the shoulder adjacent to the narrower portion 2b of the opening, by applying a total pressure of 70 kg. Without any additional sealing means, the joint thus produced exhibited a permeability coefficient of $K=1.8 \cdot 10^{-4}$ cm.$^2$/sec.$^{-1}$ for air.

Although in principle it is not necessary to provide any further seal or attachment, for example cementing, between the graphite bodies thus joined with each other, the use of such means is not detrimental and affords additional security from positional change of the joined bodies, particularly if at least one of the joined graphite bodies possesses at the junction location one or more recesses, such as gaps, grooves, semispherical recesses or the like, which contain filler substance, preferably a carbon mass. It is preferable to provide both graphite bodies with respective recesses which communicate with each other and thus pairwise constitute respectively larger hollows at the junction surface. An example of this kind is embodied in the device according to FIGS. 2 and 3.

FIG. 2 shows in section the spherical graphite envelope of a fuel element for high-temperature nuclear reactors. The graphite envelope 4 has a cylindrical bore 5 for receiving the fuel insert in form of a fuel pellet or tablet, the bore being located about the center point of the sphere. Adjacent to the cylindrical bore 5 is a conical transition 6a followed by a cylindrical bore 6b of larger diameter than the fuel-receiving bore 5. The bore 6b is widened near the surface of the sphere so as to form a peripherally closed groove 6c. The bore 6b, serving as the inlet opening, is to be gas and liquid-tightly closed after inserting the nuclear fuel. For this purpose, a plug 7 of graphite is used. The plug 7, separately shown in FIG. 3, has generally cylindrical shape. Its height and head portion are essentially of the same shape as the material cut out of the envelope 4 for forming the bore 6b, so that when the plug 7 is inserted, the envelope 4 together with the plug 7 form a continuous spherical surface. The plug, however, is provided with a peripheral groove 7a on its cylindrical surface and with a channel 7b extending from the groove 7a to the outer spherical surface.

When the plug 7 is inserted into the envelope 4, the groove 7a, machined into the plug 7, registers with the groove 6c of the envelope and forms together therewith a single peripheral channel. This channel communicates with the duct 7b. Preferably several such ducts, for example three, are uniformly distributed over the periphery of the plug 7. After the insertion of the plug into the envelope 4, the ring-shaped channel formed by the two grooves 6c and 7a is connected through the ducts 7b with the ambient atmosphere. Consequently the ducts 7b permit the escape of gases that may form in the grooves 6c, 7a from the inserted filler mass during firing, coking, graphitizing or other treatment. The filler mass is preferably applied by entirely filling the groove 6c and 7a with this mass before inserting the plug 7.

The measurements given in FIGS. 2 and 3 by way of example, as well as in the other illustrations, are in millimeters.

The material of the envelope 4 and the plug 7 may consist of extruded graphite, with the extrusion direction preferably being coincident with the axis of the cylindrical bores 5, 6b and the axis of the plug 7.

Tests were made with an embodiment according to FIGS. 2 and 3, employing a material having a maximum grain size of 0.4 mm. The material was sealed by liquid resinous impregnation and subsequent coking of the impregnation to obtain a final permeability of $4 \cdot 10^{-6}$ cm.$^2$/sec.$^{-1}$. The permeability was measured at the sphere with bore as a whole, employing the corrected formula:

$$K = 1.03 \frac{dp}{dt} \cdot \frac{V}{4\pi \cdot \Delta p} \cdot \frac{\tau a^{-1.2} \tau_z}{1.2 \tau_{z,\tau a}} (\text{cm.}^2/\text{sec.}^{-1})$$

and was ascertained by means of a conical measuring bore (not illustrated) with the original chamber size.

After completing the measurement, the measuring bore was widened to form the cylindrical bore 6b with the conical shoulder 6a and the groove 6c. As indicated in FIG. 2, the bore 6b in the tested embodiment had a diameter of 22 mm. with allowance and tolerance values according to the fit H7 (tolerance +0.021 mm. to −0.0 mm.). The cylindrical plug was made of the same material as the envelope 4 with a diameter 22 mm. for fit m6 (tolerance +0.021 mm. to +0.008 mm.). The permeability of the plug 7 corresponded to that of the envelope 4. The envelope 4 was filled in vacuum with the snugly seated cylindrical fuel pellet. Thereafter, as mentioned, the groove 6c of the envelope 4 and the groove 7a of the plug 7 were completely filled with cement, for example of the composition mentioned below. Thereafter the plug 7 was pressed into the envelope down to the shoulder 6a. This was done in vacuum with a total pressure of 150 kg. The plug protruded somewhat over the envelope but was then ground down to spherical surface. Now the sphere parts 4 and 7 were heated up to 250° C. This was done in steps, namely by first heating the sphere up to 80° C., maintaining this temperature for one hour, then heating the sphere up to 110° C. and maintaining the latter temperature for one hour, and thereafter raising the temperature to 250° C. Thereafter the sphere was fired at 1000° C. under non-oxidizing protective gas.

The cement used as filler in the grooves 6c and 7a may be given the following composition which was employed in the above-described tests:

80 parts by weight of purest obtainable graphite powder, grain size 60μ,
15 parts by weight furfuracrolein-resin having a viscosity of 300 cp.,
4 parts by weight benzotrichloride,
1 part by weight Porofor BSH (benzolsulfo-acid hydrazide) as driving agent.

The tempering and pyrolysis gases (initially HCl, thereafter H$_2$O and hydrocarbons) escape through the degassing ducts 7b which had a diameter of about 0.5 mm. in the embodiment tested. It is apparent that the cement or other filler material contained in the grooves 6c and 7a, after hardening or firing, additionally fastens the plug 7 to the envelope 4. In the present embodiment this filler substance additionally secures the plug from becoming axially displaced relative to the envelope 4. The filler substance may also involve additional sealing. The effect is augmented when a filler substance, particularly cement, is employed that expands during firing. For this purpose cement materials with driving addition can be used. Such cements are known, for example, from Italian Patent 593,818.

The above-described tests with an embodiment according to FIGS. 2 and 3 were continued by providing the fired and finished sphere with a measuring bore extending down into the hollow space between the fuel pellet and the plug 7. With the aid of this bore the permeability was measured to be $7 \cdot 10^{-6}$ cm.$^2$/sec.$^{-1}$.

In the embodiment according to FIGS. 2 and 3 the grooves 6c and 7a are so arranged that the inserted filler mass (particularly cement) secures the plug 7 from axial displacement relative to the envelope 4. However, the grooves and/or other recesses may also be so disposed that they, after being filled, secure the two graphite bodies from any relative displacement regardless of the direction.

In the embodiment of FIGS. 4 and 5, also showing a fuel element for nuclear reactors, the envelop 8 consists of a cylindrical tube having one end closed. The nuclear fuel, for example in form of a stack of fuel tablets, is filled into the tube through its open end. Thereafter the plug 9 is inserted. For receiving the plug 9 the bore of the envelope tube 8 is kept somewhat wider toward the open end, so that the plug 9 abuts against a peripheral shoulder. The cylindrical bore for receiving the plug 9 and the plug itself are mated with respective force-fit dimensions as explained in the foregoing. The plug 9 in the tube 8 consists of graphite, also in accordance with the foregoing description.

For securing the plug 9 in its position relative to tube 8, three axially extending ducts 9a are provided on the peripheral surface of the plug. These ducts communicate with spherical recesses partly in plug 9 and partly in the enveloping tube 8. The registering parts of the recesses 10 are opposite each other when the plug 9 is in the proper position and thus jointly form a spherical hollow space which communicates with the outside through one of the respective ducts 9a.

The filler substance, preferably a carbonizable cement, can be introduced in the same manner as described above. In lieu thereof the filler mass can also be introduced through the degassing ducts 9a, this manner of filling being also applicable to the embodiment according to FIGS. 2, 3 and similar embodiments.

Thus introducing the filler mass into the recesses after inserting the plug is particularly of advantage in cases where it is necessary or desirable to first seal and tighten the closed envelope as a whole, for example by liquid impregnation (impregnation with resins which are subsequently carbonized or coked). This applies particularly to the embodiment according to FIGS. 4 and 5.

The graphite tube 8 for example may be filled with pure elements of uranium carbide which are individually gastightly sealed by respective coatings of pyrographite. The cylindrical plug 9 pressed into the tube after insertion of the fuel elements may be given the fit m6, and the mating cylindrical bore in the tubular body 8 the fit H7. The three ducts 9a in the peripheral surface of the plug 9 have a diameter, for example, of 2 mm. and a depth of 7 mm. The spherical hollow space 10 communicating with each of the respective ducts 9a may have a diameter of about 5 mm., of which about 3 mm. are located in the plug 9 and 2 mm. in the envelope 8.

After the nuclear fuel is filled into the graphite tube 8 in vacuum and after the plug 9 is pressed into its seat, the envelope is impregnated with a resin solution (furfuracrolein-resin, viscosity 1000 cp.) at normal room temperature according to the vacuum pressure method. This highly viscose resin solution however cannot penetrate through the thin pores of the fine-granular graphite but can only fill the large pores near the surface and can coat the shaped graphite bodies with a resin film and, above all, can penetrate into the ducts 9a and fill them completely. The resin is then tempered and fired at 1000° C., as described above. This impregnating step is repeated once or twice. A very strong closure and also a good sealing of the entire graphite structure 8, 9 is obtained, rendering it tight against escape of gas from the interior.

The embodiments described in the foregoing with respect to the recesses in the surfaces at the junction area show that these recesses can be given a variety of shapes and arrangements. For example, the grooves may be given a slanting direction and such grooves in one and the same joint may be given different respective directions relative to each other. Upon a study of this disclosure, such and various other modifications and variations will be obvious to those skilled in the art and are indicative of the fact that our invention can be given embodiments other than particularly illustrated and described herein, without departing from the essential features of our invention and within the scope of the claims annexed hereto.

We claim:

1. A nuclear reactor element including a nuclear fuel mass and a gas and liquid-tight joint of carbon bodies comprising a carbon body housing said nuclear fuel mass and having a cylindrical opening, and another carbon body having a cylindrical surface in force-fit engagement with said cylindrical opening.

2. A nuclear reactor element including a nuclear fuel mass and a gas and liquid-tight joint of carbon bodies comprising a carbon body housing said nuclear fuel mass and having an opening, and another carbon body filling said opening, said two bodies having respective force-fit dimensions including negative allowance and corresponding to one of the bore/insert fits according to German standards H6/n5 to m5 and H7/n6 to s6 respectively.

3. A gas and liquid-tight joint of carbon bodies comprising a carbon body having a cylindrical opening, and another carbon body having a cylindrical surface in force-fit engagement with said cylindrical opening, at least one of said carbon bodies having recess means at the junction location, and carbon filler means in said recess means for additionally securing the joined bodies together.

4. In a carbon-body joint according to claim 3, wherein said recess means comprises a peripheral groove at the junction location, and said carbon filler means is located in said groove for additionally securing the joined bodies together.

5. In a carbon-body joint according to claim 3, said two carbon bodies having respective recesses facing and complementing each other at the junction location, and carbon filler mass in said recesses for additionally securing the joined bodies together.

6. In a carbon-body joint according to claim 3, said filler means consisting of carbonized cement.

7. In a carbon-body joint according to claim 3, said filler means consisting of cokable cement having the property of expanding during coking.

8. In a carbon-body joint according to claim 3, said recess means being close to but spaced from the outside of the joint, and ducts in one of said carbon bodies through which said recess means are connected with the outside.

9. In a carbon-body joint according to claim 3, wherein said recess means comprises a plurality of individual generally cup-shaped recesses distributed over the junction area, and ducts in one of said bodies connecting said recesses with the outside.

10. A nuclear fuel element including a mass of nuclear fuel material and a gas and liquid-tight joint of a graphite enclosure, said joint comprising a tubular body of graphite for enclosing the nuclear fuel material, said tubular body having a coaxially cylindrical, machined opening at one end, a graphite plug having a mating cylindrical portion seated in said opening and forming a force-fit together therewith.

References Cited by the Examiner

UNITED STATES PATENTS

| | | | |
|---|---|---|---|
| 2,711,840 | 6/1955 | Gits et al. | 220—42 |
| 2,957,716 | 10/1960 | Kaufmann et al. | 287—127 |
| 2,991,601 | 7/1961 | Glatter et al. | |
| 2,996,444 | 8/1961 | Simnad | 176—68 |
| 3,003,658 | 10/1961 | Lindsey | 220—42 |
| 3,030,544 | 4/1962 | Zamboldi et al. | 287—126 |
| 3,048,433 | 8/1962 | Doetsch | 287—127 |
| 3,161,580 | 12/1964 | Thomas | 287—127 X |

FOREIGN PATENTS 621,315  5/1961  Canada.

OTHER REFERENCES

2nd Geneva Conference on Atomic Energy, vol. 7, pp. 748–50, September 1958, TK 9006 I 5.

Bickerdike et al.: Production of Impermeable Graphite, Nuclear Power, February 1959, pp. 86–88.

LEON D. ROSDOL, *Primary Examiner.*

OSCAR R. VERTIZ, CARL D. QUARFORTH,
*Examiners.*

R. W. MacDONALD, J. V. MAY, L. D. RUTLEDGE,
*Assistant Examiners.*